United States Patent Office 3,681,317
Patented Aug. 1, 1972

3,681,317
ORGANO-METALLIC COMPOUNDS AND USES THEREOF
Alexander Joseph Peter Pioli, William Brian Hollyhead, and Peter Frank Todd, Runcorn, England, assignors to Imperial Chemical Industries Limited, London, England
No Drawing. Filed May 27, 1970, Ser. No. 41,074
Claims priority, application Great Britain, May 28, 1969, 26,923/69, 26,924/69
Int. Cl. C08f 3/04, 7/06
U.S. Cl. 260—94.9 B      2 Claims

ABSTRACT OF THE DISCLOSURE

Organometallic compounds of the general formula

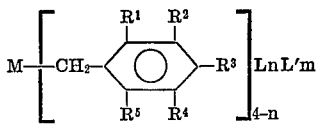

where
M is a Group IV transition metal
$R^{1-5}$ are substituents which may be the same or different
n is an integer from 0 to 3, provided that when M=titanium and n=0, $R^{1-5}$ are not all hydrogen,
L is an anionic ligand
L' is a neutral ligand and
m is an integer from 0 to 2.

Also processes for their preparation, and their use as olefin, especially ethylene, polymerisation initiators.

---

This invention relates to organometallic compounds, to processes for their preparation, and to their use as initiators for the polymerisation of unsaturated monomers.

The invention provides organo-metallic compounds of the general formula

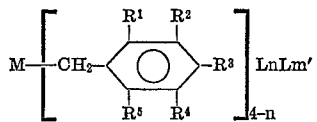

where
M is a Group IV transition metal
$R^{1-5}$ are substituents which may be the same or different,
n is an integer from 0 to 3, provided that when M=titanium and n=0, $R^{1-5}$ are not all hydrogen,
L is an anionic ligand
L' is a neutral ligand and
m is an integer from 0 to 2.

Organic groups according to the formula in brackets above will be referred to as "benzyl groups."

Ligands L and L' may be absent, in which case valency and co-ordination requirements are satisfied by the benzyl groups. Such compounds will be referred to as "isoleptic." Ligands L', which are neutral, may be present, giving the metal a co-ordination number of 5 or 6, rather than the usual 4 when L' is absent.

$R^{1-5}$ are preferably selected from hydrogen, alkyl groups containing one to six carbon atoms, cycloalkyl, halogen, oxyalkyl in which the alkyl group contains from one to six carbon atoms, but other organic groups are also suitable, including longer chain alkyl and oxyalkyl, alkaryl, aryl, aralkyl and aryloxy groups. Further, one or more pairs of groups $R^{1-5}$ may be linked to form cyclic structures, especially where two adjacent groups form a second aromatic ring which is coplanar with the ring already present. Examples of this type of compound are tetrakis-(naphthylmethyl) compounds of the Group IV metals.

Ligands L are preferably halogen, but they may provide oxygen-metal bonds in the form of oxyhydrocarbyl or oxy-silicon groups.

Ligands L' are suitably Lewis bases free from active hydrogen which would react with the organo-metallic compound. Examples are tertiary phosphine oxides and amines such as tri(n-butyl) phosphine oxide and pyridine.

Isoleptic benzyl compounds according to our invention may be prepared by the reaction of a tetrahalide of a Group IV transition metal with an organometallic compound of a Group I to III metal which contains at least one ligand of the general formula:

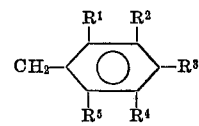

where $R^{1-5}$ have the meaning ascribed above. Particularly convenient are benzyl and substituted benzyl Grignard reagents. The reaction of the organometallic compound and the transition metal halide are conveniently carried out in liquid media, the second mentioned component being added as a solution or suspension. Low temperature (<0° C.) are preferred and dry, oxygen-free conditions are essential. Ether, or hydrocarbon solvents are suitable. The product may be recovered by crystallisation after removal of solvent in vacuo, or by addition of a precipitating solvent. The products are often soluble in aromatic solvents and it is convenient to prepare, store and use the compounds of our invention in such solvents. The precise selection of solvents varies with the benzyl compound being prepared. Procedures which may be used to free the product from magnesium and halogen are described later. The compounds must be stored in dry, oxygen-free conditions, but have reasonable thermal stability, compared with other transition metal organometallic compound such as π-allyl compounds. For example, tetrakis(benzyl)zirconium and hafnium may be kept at room temperature for 24 hours without serious decomposition, or at 0° C. for considerably longer periods.

Compounds of our invention are characterised by the following NMR data. The methylene protons in the NMR spectrum usually show a single line in the region $6.8\tau$ to $7.3\tau$ for titanium compounds and $8.0\tau$ to $8.6\tau$ for zirconium and hafnium compounds. The compounds are typically red (titanium) or yellow to orange-yellow (zirconium and hafnium).

Tetrakis(benzyl)zirconium can be isolated as orange-yellow crystals, M.P. 113° C. (dec.), and tetrakis(benzyl) hafnium as yellow crystals M.P. 99° C. (dec.).

Benzyl compounds in which ligands L are present, n being a positive integer from 1 to 3, may be prepared by the reaction of isoleptic compounds according to our invention with an acidic compound of the type HX where X is an anionic group, such as halide, oxyhydrocarbyl or oxy-silicon.

The amounts of HX used depends on the number of ligands L required. Thus equimolar amounts of tetrakis (benzyl)zirconium and hydrogen chloride react to form tris(benzyl)zirconium monochloride and two moles of hydrogen chloride with one mole of the isoleptic zirconium compound give bis(benzyl)zirconium dichloride, and so on.

The reaction is carried out by adding the required amount of acid HX to a solution of the benzyl compound. Hydrogen halides may be added by distilling the gas into the benzyl solution at low temperature, e.g. about −80° C.

Further, one or two ligands L' may be introduced into the compounds described whether L is present or not by direct reaction, preferably in solution. For example, to a solution of tetrakis(benzyl)zirconium one or two molar equivalents of pyridine may be added and the appropriate 5 or 6 co-ordinate complex may be isolated.

According to a further aspect of our invention, benzyl compounds of the type described above may be used to initiate the polymerisation or copolymerisation of olefinically unsaturated monomers. The process requires that the Group IV transition metal compound is contacted with the olefin under substantially dry and oxygen-free conditions.

Particularly useful initiators are the benzyl compounds of zirconium and hafnium according to Formula 1 where $m=0$ and $R^{1-5}=H$. These are considerably more active initiators for the polymerisation of ethylene than in the corresponding titanium compound. Also useful are compounds according to Formula 1 in which preferably 1, or at most 2 of the groups $R^{1-5}$ are substituents other than hydrogen, and also $m=0$.

Olefinically unsaturated monomers which may be polymerised by our process include olefins, such as ethylene or propylene diolefins, such as butadiene; and polar monomers, such as styrene and methyl methacrylate. Mixtures of such monomers may also be copolymerised; but any given monomer may not necessarily be copolymerisable with all other monomers of the group.

The polymerisation process is effected by contacting the monomer or monomers with one or more of the compounds described, under oxygen- and moisture-free conditions. The monomer may be used as a liquid or, if it is not liquid under the reaction conditions, in solution in a suitable solvent. Solvents which may be used include aliphatic or aromatic solvents such as pentane, hexane, toluene or mixtures of such solvents. The initiators, being solids, are preferably added to the reactor as solutions in a solvent of the types mentioned above.

Pressures of one atmosphere and above are preferred; but the choice of pressure will be largely dependent on the monomer being polymerised. For example, when polymerising ethylene, pressures of about 10 kg./cm.$^2$ or above are preferred and much higher pressures, for example up to 3000 kg./cm.$^2$ may be used. The use of the last mentioned very high pressures enables normal high pressure reactor technology to be used, including working under conditions in which the monomers, polymer and initiator co-exist as a single fluid phase.

The initiators may be used over a wide temperature range, e.g. from 0° C. to 200° C., final choice of temperature being dependent upon the nature of the benzyl compound and the monomer being polymerised. When ethylene is being polymerised it is often preferred to work near the upper end of the range, for example from 130° C. to 160° C. This is especially so when working under the aforementioned single fluid phase conditions.

Although the substituted benzyls of our invention may be readily isolated from solution, it will be appreciated that they may be used to initiate polymerisation without isolation, for example, by utilising the entire reaction medium, preferably after filtering to remove precipitated magnesium chloride if the compound has been prepared by the Grignard route.

The concentration of initiator in the polymerisation reaction mixture is not critical and is ideally kept as low as is possible consistent with obtaining a reasonable activity. However, it generally lies between 0.05 and 10 mMoles/litre.

The invention will be illustrated by the following examples.

GENERAL PROCEDURE (a) Preparation of Grignard Reagent.—2 moles of the appropriately substituted benzyl chloride, dissolved in 300 ml. of ether, are added with stirring to a suspension of 60 g. of magnesium turnings in 400 ml. of ether over a period of two hours, the reaction being initiated by the addition of a crystal of iodine. The yield of Grignard reagent is estimated by he normal titration technique. Using 232 ml. of benzyl chloride $C_6H_5CH_2Cl$, the yield was about 92%.

(b) Preparation of transition metal benzyl compound.—A group IV transition metal tetrahalide is added to an ethereal solution of the appropriately substituted benzyl magnesium chloride prepared as under (a) above, the temperature of which is maintained at about −20° C. After addition of all the metal halide, the solution is stirred for two hours at −20° C. and then for a further hour at ambient temperature. At the end of this time magnesium chloride, which is precipitated in the reaction, is removed by filtration leaving a coloured solution of the required transition metal benzyl compound containing small amounts of magnesium chloride etherate.

For complexes soluble in aromatic solvents only.— The transition metal benzyl compound is purified by concentrating the ether solution, which is then cooled to about −25° C. This affords either (1) crystals of the appropriate compound, which may be removed from the mother liquors and taken up in an aromatic solvent or (2) an oil, in which case the requisite quantity of dioxan is added to precipitate all magnesium chloride from solution, which is then filtered, concentrated and set aside to crystallise at −25° C. When the crystals form they are again separated from the mother liquors and taken up in an aromatic solvent. It is noted that, although the crystals may be separated and stored in the solid state, it is preferred to store them in aromatic solution, as it is in such media that the compounds are commonly used. This procedure is particularly useful for preparing tetrakis(benzyl)zirconium and hafnium.

For complexes soluble in aliphatic solvents.—The ethereal solution containing the transition metal benzyl compound plus small amounts of dissolved magnesium chloride is treated to remove the ether under reduced pressure at −15° C. and the resulting solid product stirred with pentane at room temperature. Filtration of the resulting extract yields a solution of the appropriate benzyl compound in pentane.

Example 1

Using the procedure given under (b) above, 30 g. of zirconium tetrachloride was reacted with benzyl magnesium chloride. The brown/yellow solution produced contained 33.6 g. of zirconium tetrabenzyl. (Yield 59%). Crystals of zirconium tetrabenzyl isolated from this solution had a melting point of 113° C. with decomposition.

A solution of the product in deuterobenzene was analysed by NMR and showed peaks at about 3.60τ and 2.90τ, assignable to aromatic protons, and a peak at 8.4τ, assignable to methylene protons.

Crystallographic examination of a single crystal of the product indicated a tetrahedral arrangement of four benzyl groups about a single zirconium atom.

Example 2

Using the procedure given under (b) above, 32 g. (0.1 mole) of hafnium tetrachloride was reacted with 0.4 mole of benzyl magnesium chloride in ether. The resultant yellow solution was filtered and then evaporated to dryness under vacuum at room temperature. The yellow solid residue was dissolved in the minimum quantity of toluene at room temperature and the resultant solution filtered and cooled to −60° C. Yellow crystals (21 g.) separated from the solution and were further purified by recrystallisation from toluene.

The product hafnium tetrabenzyl, which could be kept for long periods at room temperature under nitrogen without visible deterioration, had a m.pt. of 99° C. with decomposition. Its NMR spectrum was very similar to that reported above for zirconium tetrabenzyl, having multiplets at 3.5τ and 3.0τ and a singlet at 8.55τ.

Examples 3 and 4

A 1 litre stainless steel stirred autoclave was purged six times with high purity ethylene to remove traces of oxygen and moisture. 400 ml. of toluene was then introduced by syringe under a counter current of ethylene and the system pressurised with 10 kg./cm.$^2$ of hydrogen and 27 kg./cm.$^{-2}$ of ethylene to ensure saturation of the solvent. 1.5 millimoles of initiator in toluene solution was then injected by syringe and the reactor re-pressurised. The temperature of the autoclave was raised to 160° C. and polymerisation allowed to continue for 1 hour. At the end of this time the polymer was removed, washed with acid methanol and dried. The polymer was weighed and the yield calculated in terms of g. of polyethylene per millimole of initiator per kg./cm.$^2$ per hour. The results are set out in Table 1. An equivalent result using titanium tetrabenzyl is given by way of comparison.

| Example | Initiator | Yield of polyethylene, g./mmole/kg. cm.$^{-2}$/hr. |
|---|---|---|
| 3 | Zr(benzyl)₄ | 0.75 |
| 4 | {Hf(benzyl)₄ | 0.42 |
|   | {Ti(benzyl)₄ | 0.19 |

Example 5

Polymerisation of p-bromo styrene with Zr of Hf tetrabenzyl.

Zirconium tetrabenzyl (0.154 g. in 13 ml. toluene) was added to 47.6 g. of p-bromo styrene under nitrogen. The resultant mixture was diluted to 100 ml. with toluene and maintained at 30° C. for 24 hours. At the end of this time the polymer produced was precipitated by the addition of methanolic hydrochloric acid, removed from the solution by filtration and dried. Yield 4.8 g. poly(p-bromo styrene).

Examples 6 to 12

Zirconium and titanium tetra(substituted benzyl) compounds were made using the appropriate form of the general procedure (b) above. The compounds were analysed by NMR spectroscopy giving the results shown in the following table.

| Ex. | Compound | Peaks indicating— Methylene protons, τ | Methyl protons, τ |
|---|---|---|---|
| 6 | Zr(-CH₂-⟨⟩-OCH₃)₄ | 8.34 | 6.55 |
| 7 | Ti(-CH₂-⟨⟩-OCH₃)₄ | ~7.1 | 6.53 |
| 8 | Zr(-CH₂-⟨⟩⟨⟩)₄ | 8.24 |  |
| 9 | Ti(-CH₂-⟨⟩⟨⟩)₄ | ~7.1 |  |
| 10 | Zr(-CH₂-⟨⟩-CH₃)₄ | 8.30 | 7.68 |
| 11 | Ti(-CH₂-⟨⟩-CH₃)₄ | 7.04 | 7.70 |
| 12 | Ti(-CH₂-⟨⟩-Cl)₄ | 6.92 |  |

Examples 13 to 17

A 1 litre stainless steel stirred autoclave was purged six times with high purity ethylene to remove traces of oxygen and moisture. 400 ml. of toluene was then introduced by syringe under a counter current of ethylene and the system pressurised with 10 kg./cm.$^{-2}$ of hydrogen and 27 kg./cm.$^{-2}$ of ethylene to ensure saturation of the solvent. 1.5 millimoles of initiator in toluene solution was then injected by syringe and the reactor re-pressurised. The temperature of the autoclave was raised to 160° C. and polymerisation allowed to continue for 1 hour. At the end of this time the polymer was removed, washed with acid methanol and dried. The polymer was weighed and the yield calculated in terms of g. of polyethylene per millimoles of initiator per kg./cm.$^2$ per hour. The results are set out in the table below.

| Example | Initiator | Yield of polyethylene, g./mmole/kg. cm.$^{-2}$/hr. |
|---|---|---|
| 13 | Zr(-CH₂-⟨⟩-CH₃)₄ | 0.94 |
| 14 | Zr(-CH₂-⟨⟩-OCH₃)₄ | 0.38 |
| 15 | Zr(-CH₂-⟨⟩⟨⟩)₄ | ~1.9 |
| 16 | Ti(-CH₂-⟨⟩-CH₃)₄ | 0.83 |
| 17 | Ti(-CH₂-⟨⟩-Cl)₄ | 0.38 |

It will be seen from the above results that substituents in the aromatic ring of the benzyl group affect the polymerisation ethylene activity of the compounds, and the activities are all considerably higher than when unsubstituted titanium benzyl is used.

Examples 18 to 20

The procedure of Examples 13 to 17 was repeated using different initiators, prepared by the general procedure above. Gas pressures were: ethylene 10 kg. cm.$^{-2}$; hydrogen 10 kg. cm.$^{-2}$. Amounts of initiator: 1 millimole. Temperature: 80° C. The results are shown in the table below.

| Example | Initiator | Yield of polyethylene, g./mmole/kg. cm.$^{-2}$/hr. |
|---|---|---|
| 18 | Zr(-CH₂-⟨⟩-F)₄ | 2.0 |
| 19 | Zr(-CH₂-⟨⟩-Cl)₄ | 2.3 |
| 20 | Zr[CH₂-⟨CH₃,CH₃,CH₃⟩]₄ | (¹) |

¹ Not measured.

Example 21

Tetrakis(benzyl)zirconium in toluene (146 ml.; 0.045 g./ml. was cooled to −80° C. and degassed. Dry, gaseous hydrogen chloride (0.575 g.) was distilled into the solution at −80° C. with stirring. A rapid reaction occurred and the colour of the solution changed from yellow to orange. Analysis of the solution was consistent with the formation of tris(benzyl)zirconium chloride. (Zr:Cl ratio=1:0.92 as measured.) 1.2 millimoles of this compound was used as an ethylene polymerisation initiator under the conditions of Examples 13 to 17, but with ethylene and hydrogen pressures both at 10 kg./cm.$^{-2}$. After 1 hour at 80° C., the polymer yield was 6.0 g. which gives an activity of 5.1 g./millimole/kg. cm.$^{-2}$/hr.

Example 22

The above procedure was repeated using half the amount of tetrakis(benzyl)zirconium. At −80° C. an orange solid and orange solution were produced. On warming to 0° C. the solid dissolved and was reformed as bright orange crystals at −30° C. Analysis of the crystals was consistent with the formation of bis(benzyl) zirconium dichloride (Zr:Cl ratio=1:2.02 as measured). 1.0 millimoles of this compound was used as an ethylene polymerisation initiator under the conditions of Examples 13 to 17, but with ethylene and hydrogen pressures both at 10 kg. cm.$^{-2}$. After 1 hour at 80° C., the polymer yield was 45 g. which gives an activity of 4.5 g./millimole/kg. cm.$^{-2}$/hr.

Example 23

The procedure of Examples 13 to 17 was repeated using tetrakis(benzyl)zirconium (5 millimoles) to polymerise propylene.

Pressure: 16.5 kg./cm.$^2$.
Temperature: 120° C.
Time: 4 hours
Yield: 0.2 g.

Examples 24 and 25

Preparation of derivatives containing neutral ligands.—To a stirred solution of tetrakis(benzyl)zirconium (1 g.) in benzene (8 ml.) maintained at 10° C. was added, dropwise, pyridine (0.177 g.) dissolved in a small quantity of benzene. The colour changed from yellow to orange. The NMR spectrum of the resulting solution showed the presence of a new peak at 7.81τ and absence of the usual tetrabenzyl peak at 8.4τ. Analysis was consistent with tetrakis(benzyl)zirconium monopyridine.

The above procedure was repeated using 0.354 g. of pyridine. The colour changed from yellow to orange-red. The NMR spectrum showed a new peak at 7.90τ and the absence of a peak at 8.4τ. In addition, a new double peak appeared at 1.77τ, assignable to the σ protons of pyridine co-ordinated to metal. Analysis was consistent with tetrakis(benzyl)zirconium bis(pyridine).

What we claim is:

1. Process for the homopolymerisation or copolymerisation of olefinically unsaturated monomers in which the monomer is contacted with an organo-metallic compound of the general formula:

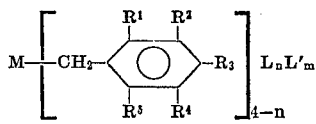

where M is a group IV transition metal,
R$^{1-5}$ are substituents selected from the group consisting of hydrogen, alkyl, cycloalkyl, halogen, oxyalkyl, alkaryl, aryl, aralkyl, aryloxy and two adjacent R$^{1-5}$ groups joined together to complete an aromatic ring, n is an integer from 0 to 3, provided that when M is titanium, R$^{1-5}$ are not all hydrogen,
L is halogen
L' is an amine
m is an integer from 0 to 2,
under substantially dry and oxygen-free conditions.

2. Process for the homopolymerisation of ethylene in which ethylene is contacted with an organometallic compound according to claim 1 in which m=0, in a liquid reaction medium at a pressure from 1 to 3000 kg./cm.$^2$ and at a temperature from 0 to 200° C.

References Cited

UNITED STATES PATENTS 3,070,549  12/1962  Ziegler et al. _____ 260—94.9 B

OTHER REFERENCES

Boustany, K. S., Bernauer, K. and Jacot-Guillarmod, A., Helvetica Chimica Acta 50(5), 1305–13 (1967, Scientific Library QD 1 H4.

Giannini, U. and Zucchini, U., Chemical Communications 1968 (16), 940, Scientific Library QD 1 C6 ad.

JOSEPH L. SCHOFER, Primary Examiner

A. HOLLER, Assistant Examiner

U.S. Cl. X.R.

252—431 R; 260—89.5 A, 91.5, 93.5 S, 93.7, 94.3, 429.3, 429.5